United States Patent
Stroup (10) Patent No.: US 9,914,002 B2
(45) Date of Patent: Mar. 13, 2018

(54) WORKOUT BAG ASSEMBLIES

(71) Applicant: Thomas Stroup, LLC, Orlando, FL (US)

(72) Inventor: Thomas Stroup, Windermere, FL (US)

(73) Assignee: Thomas Stroup, LLC, Orlando, FL (US)

( * ) Notice: Subject to any disclaimer, the term of this patent is extended or adjusted under 35 U.S.C. 154(b) by 0 days.

(21) Appl. No.: 14/932,259

(22) Filed: Nov. 4, 2015

(65) Prior Publication Data

US 2016/0129292 A1    May 12, 2016

Related U.S. Application Data

(60) Provisional application No. 62/076,518, filed on Nov. 7, 2014.

(51) Int. Cl.
*A63B 21/06* (2006.01)
*A63B 21/00* (2006.01)
(Continued)

(52) U.S. Cl.
CPC .... *A63B 21/00065* (2013.01); *A63B 21/0004* (2013.01); *A63B 21/065* (2013.01); *A63B 21/072* (2013.01); *A63B 21/4005* (2015.10); *A63B 21/4035* (2015.10); *A63B 23/12* (2013.01); *G09B 19/003* (2013.01); *G09B 19/0038* (2013.01); *A63B 5/00* (2013.01); *A63B 21/0602* (2013.01); *A63B 21/0603* (2013.01);
(Continued)

(58) Field of Classification Search
CPC .......... A63B 21/00065; A63B 21/0601; A63B 21/0602; A63B 21/0603; A63B 21/065; A63B 21/4005; A63B 21/4007; A63B 21/00061; A63B 21/0607; A63B 21/0004; A63B 21/0604; A63B 21/4001; A63B 21/4003; A63B 21/4025; A63B 21/4033; A63B 21/4035; A63B 21/4039; A63B 23/12; A63B 23/1236; B65D 33/008; B65D 33/001; B65D 33/002
USPC ............ 53/469, 413; 224/653; 220/509–511; 383/37, 38; 190/109–111, 104; 150/113, 150/117; 206/142, 446, 315.1–315.8
See application file for complete search history.

(56) References Cited

U.S. PATENT DOCUMENTS

| 1,211,853 | A | * | 1/1917 | Huggins | ................ | B65D 33/10 |
| | | | | | | 383/21 |
| 1,726,245 | A | * | 8/1929 | Shelton | .................. | A63B 55/00 |
| | | | | | | 206/315.4 |

(Continued)

*Primary Examiner* — Gregory Winter
(74) *Attorney, Agent, or Firm* — Adler Pollack & Sheehan P.C.; Daniel J. Holmander (57) ABSTRACT

A workout bag assembly including a tubular body having a closed end and an accessible end. The tubular body defines an interior divided into at least two compartments by a partition. The tubular body also has an exterior with two inner handles side-by-side along a length of the tubular body and two end handles. Each end handle is adjacent to a respective end. A partition divides an interior of the tubular body into a first compartment and a second compartment. Three tubes can receive a weighted material. The first compartment is sized and configured to snugly hold one of the three tubes when filled, and the second compartment is sized and configured to snugly hold two of the three tubes when filled.

4 Claims, 5 Drawing Sheets

(51) Int. Cl.
  *G09B 19/00* (2006.01)
  *A63B 21/065* (2006.01)
  *A63B 23/12* (2006.01)
  *A63B 21/072* (2006.01)
  *A63B 69/00* (2006.01)
  *A63B 21/068* (2006.01)
  *A63B 5/00* (2006.01)

(52) U.S. Cl.
  CPC ......... *A63B 21/0604* (2013.01); *A63B 21/068* (2013.01); *A63B 21/0724* (2013.01); *A63B 23/1209* (2013.01); *A63B 23/1236* (2013.01); *A63B 69/0028* (2013.01); *A63B 2209/00* (2013.01); *A63B 2209/10* (2013.01); *A63B 2225/09* (2013.01); *A63B 2244/08* (2013.01)

(56) References Cited

U.S. PATENT DOCUMENTS

| | | | | |
|---|---|---|---|---|
| 3,128,854 A * | 4/1964 | Specht | ............... | A45C 3/00 190/903 |
| 5,102,529 A * | 4/1992 | Hickin | ............... | A63B 55/00 206/315.3 |
| 5,159,999 A * | 11/1992 | Voigt | ............... | A45C 5/00 150/106 |
| 5,427,453 A * | 6/1995 | Cloessner | ............... | A45C 3/00 190/109 |
| 6,126,054 A * | 10/2000 | Riemer | ............... | A45C 13/1046 224/601 |
| 7,341,377 B1 * | 3/2008 | Baxter | ............... | A45C 11/00 294/159 |
| 8,109,863 B2 * | 2/2012 | Gilberti | ............... | A63B 21/0603 473/438 |
| 8,276,351 B1 * | 10/2012 | Henkin | ............... | A63B 21/00058 482/89 |
| 8,413,776 B1 * | 4/2013 | Huff | ............... | A45C 13/00 150/113 |
| 2006/0229173 A1 * | 10/2006 | Foley | ............... | A63B 21/06 482/105 |
| 2007/0089955 A1 * | 4/2007 | Oberst | ............... | A45C 7/0086 190/111 |
| 2015/0202486 A1 * | 7/2015 | Childs | ............... | A63B 21/075 482/106 |
| 2015/0273306 A1 * | 10/2015 | Fu | ............... | A63B 69/201 482/87 |
| 2017/0001060 A1 * | 1/2017 | D'Alesio | ............... | A63B 21/4035 |

\* cited by examiner

WORKOUT BAG ASSEMBLIES

CROSS-REFERENCE TO RELATED APPLICATION

This application claims priority to U.S. Provisional Patent Application No. 62/076,518, filed Nov. 7, 2014, which is incorporated herein by reference.

BACKGROUND OF THE INVENTION

1. Field of the Invention

The subject disclosure relates to methods fitness equipment, and more particularly to workout bag assemblies.

2. Background of the Related Art

Working out with sandbags by lifting and swinging them is a great way to train and improve fitness. However, sandbags are not easily adjustable for an athlete. Although a sand bag holds a volume of sand which may be poured out to reduce the weight, the sand is not easily added back in, which requires tools like a shovel and storage container. Furthermore, removing sand from the sandbag can result in an unstable sandbag may during workouts because the sand will shift inside the bag. As a result, injury and/or damage to property can result if the bag is dropped during a workout.

SUMMARY OF THE INVENTION

In view of the above, a need exists for a workout bag assembly that is easily adjustable and more stable and versatile during workouts.

In one embodiment, the present disclosure is directed to a method for working out using a workout bag assembly comprising the steps of: filling at least two tubes with a material; inserting a first tube of the at least two tubes in a bag; performing a first exercise with the bag having only the first tube therein; inserting a second tube of the at least two tubes into the bag to increase a weight of the bag; and performing a second exercise with the bag having only the first and second tube therein. The method may further comprise the steps of: providing a plurality of handles on the bag; providing at least one shoulder strap selectively connected to the bag; providing a tube handle on at least one of the at least two tubes; removing the one of the at least two tubes with the tube handle; and using the tube handle as a grip during an exercise.

The method may also include the step of providing a partition in an interior of the workout bag assembly so that the first tube snugly fits on a first side of the partition and the second tube only fits on a second side of the partition. Alternatively, the method provides a partition in an interior of the workout bag assembly so that the first tube snugly fits on a first side of the partition and the first and second tubes together fit snugly on a second side of the partition. The first and second tubes may be inserted on the second side of the partition. A third tube may be inserted in the bag as well. The workout bag assembly may include access to video content for how to use the workout bag assembly.

And yet another embodiment of the present invention includes a work out bag assembly including an elongated tubular body and at least two tubes. The elongated tubular body has a closed end and an accessible end. The tubular body also defines an interior divided into at least two compartments and an exterior having at least one handle. The at least two tubes receive a material for weight. A first tube of the at least two tubes is sized and configured to snugly fit in a first compartment of the at least two compartments.

Another embodiment of the present disclosure includes a workout bag assembly including a tubular body having a closed end and an accessible end. The tubular body defines an interior divided into at least two compartments by a partition. The tubular body also has an exterior with two inner handles side-by-side along a length of the tubular body and two end handles. Each end handle is adjacent to a respective end. A partition divides an interior of the tubular body into a first compartment and a second compartment. Three tubes can receive a weighted material. The first compartment is sized and configured to snugly hold one of the three tubes when filled, and the second compartment is sized and configured to snugly hold two of the three tubes when filled. A zipper can selectively close the accessible end. Preferably, the three tubes have a closure mechanism for selectively filling, emptying and closing the tubes.

The subject technology solves the problems of the prior art by providing a workout bag assembly that uniquely includes a subdivided interior with a hammock. The workout bag assembly has a body that holds three (or more) removable tubes of material used to adjust the weight of the workout bag assembly. The workout bag assembly may further include multiple handles formed on the body of the bag in different positions to provide a number of different grips for the user. The workout bag assembly may include two side-by-side handles on the workout bag assembly to permit overhand and underhand grips and handles on each end of the workout bag assembly, perpendicular to the side-by-side handles, to permit grips with palms facing inwards. Furthermore, optional shoulder straps may be attached to the workout bag assembly to allow the user to wear the workout bag assembly like a back pack for additional challenge during calisthenics, running, jogging, and the like. Preferably, the workout bag assembly can be fine tuned for occupational training.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The subject technology overcomes many of the prior art problems associated with workout bags and methods for using the same. The advantages, and other features of the workout bag assemblies and methods disclosed herein, will become more readily apparent to those having ordinary skill in the art from the following detailed description of certain preferred embodiments taken in conjunction with the drawings which set forth representative embodiments of the present invention.

Figure 1A:
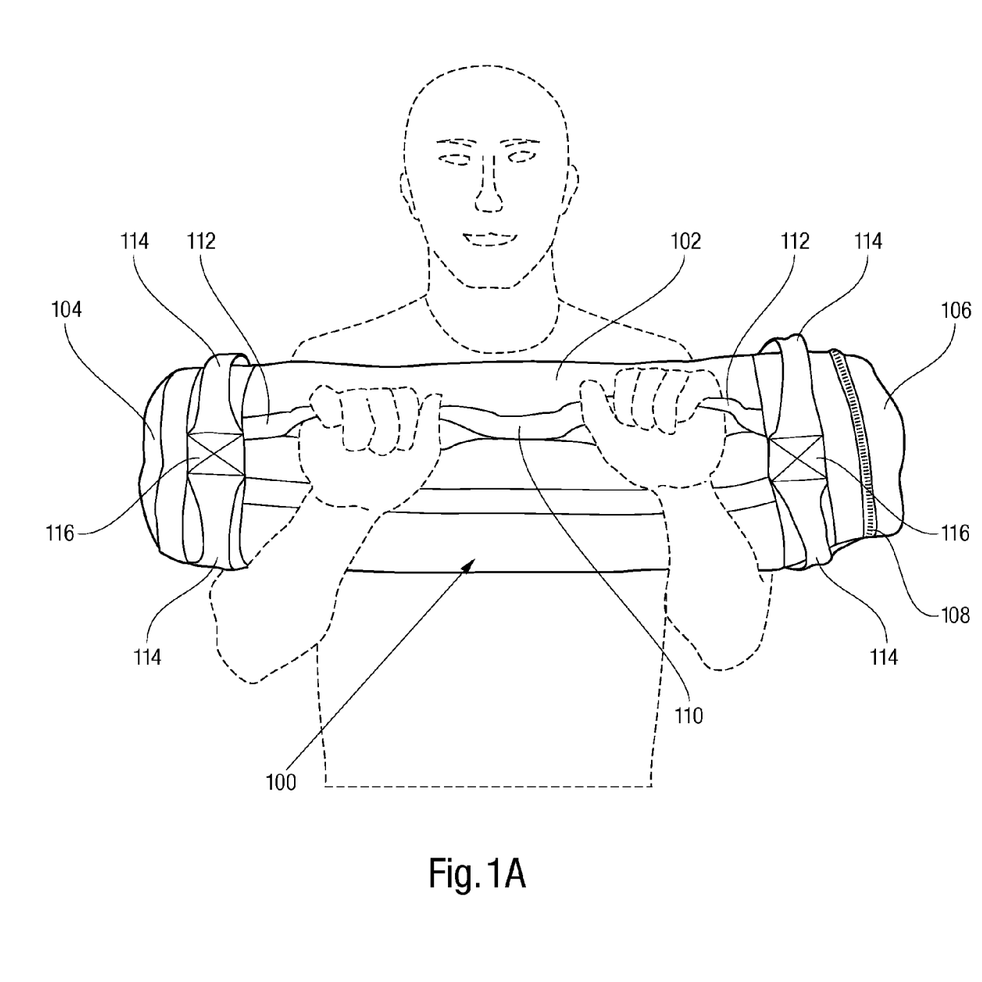
FIG. 1A illustrates a person using a workout bag assembly in accordance with the subject disclosure.
Figure 1B:
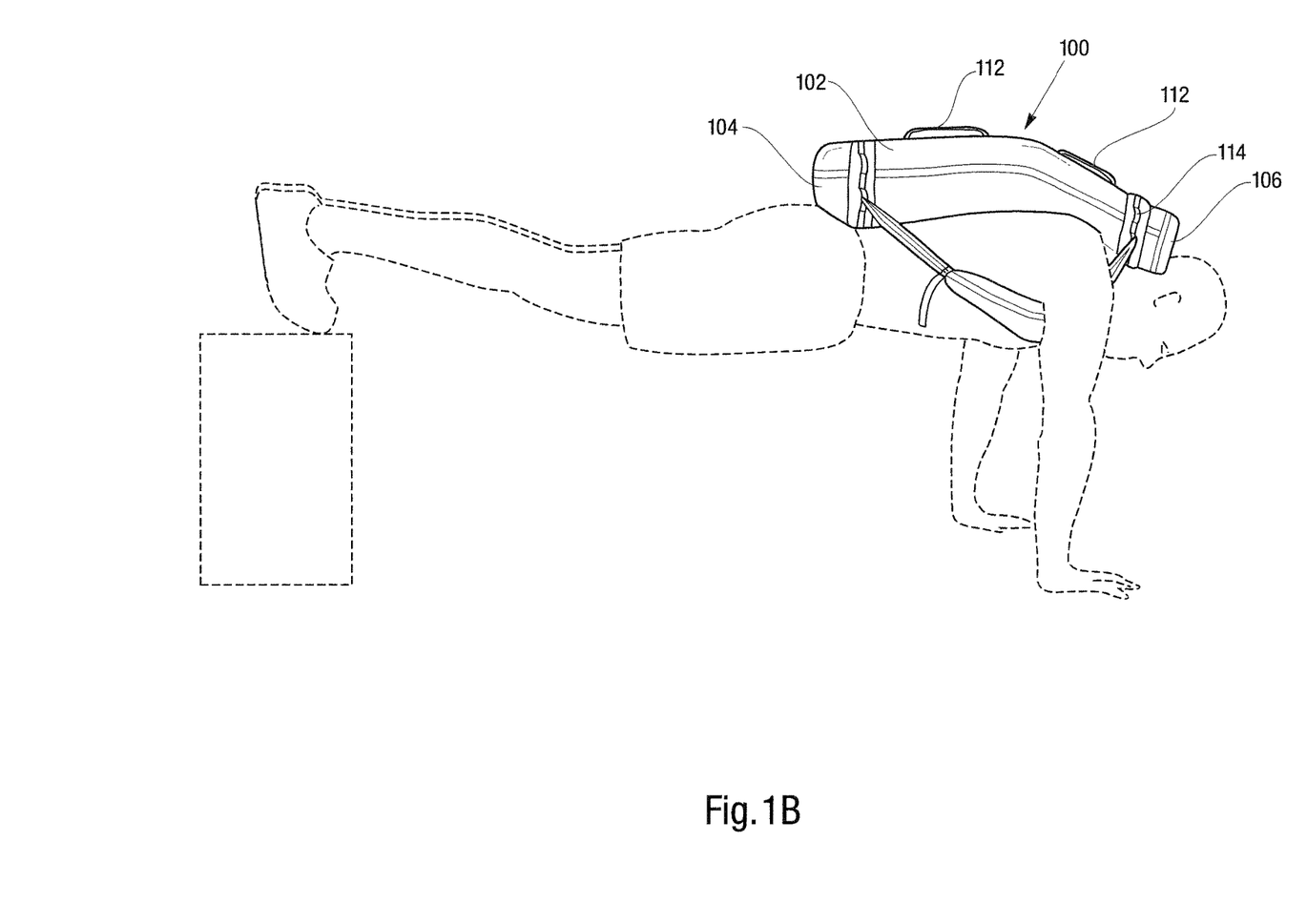
FIG. 1B illustrates another use of a workout bag assembly in accordance with the subject disclosure.

Referring now to FIGS. 1A and 1B, a workout bag assembly 100 in accordance with the subject disclosure is shown. The workout bag assembly 100 is versatile and provides a multitude of ways to increase fitness. The workout bag assembly 100 may be used as a weight for exercises such as shoulder presses (FIG. 1A), curls, bench presses and the like. The workout bag assembly 100 may be sized up or down to be appropriate for the activity. Additionally, the workout bag assembly 100 serves as added weight during a training activity such as push-ups (FIG. 1B), running, walking, hiking and the like.

Figure 2:
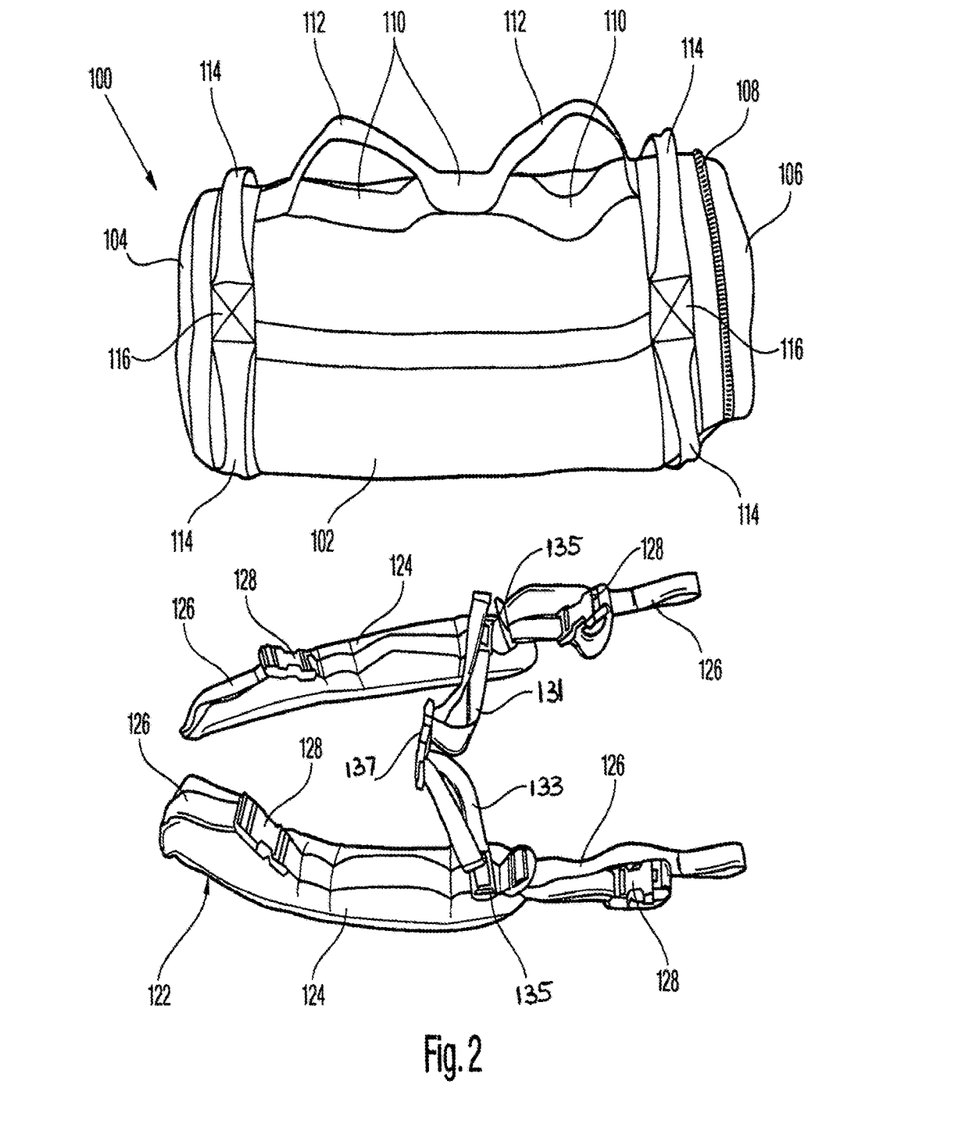
FIG. 2 is a perspective view of a workout bag assembly ready for use in accordance with the subject disclosure.

Referring now to FIG. 2, a perspective view of the workout bag assembly 100 ready for use in accordance with the subject disclosure. The workout bag assembly 100 includes a tubular body 102 with an enclosed end 104 and an accessible end 106. The workout bag assembly 100 may alternatively be square, rectangular, circular, triangular and various shapes depending upon the intended use. The workout bag assembly 100 is preferably manufactured from a heavy duty cloth (natural, synthetic and/or blends thereof) with reinforced stitching, preferable to military standards (MILSPEC) for durability.

During use, the accessible end 106 is normally closed. The accessible end 106 is selectively closed using a closure mechanism 108 such as a zipper, hook-and-loop fabric, snaps and the like. Along the elongated length of the workout bag assembly 100, there is a reinforced webbing strip 110. Two side-by-side inner handles 112 are attached to the strip 110. The positioning of the inner handles 112 is such that a user may easily grip each handle 112 with one hand at the same time. Additional outer handles 114 encircle each end 104, 106 of the workout bag assembly 100. These handles 114 are also attached to a reinforced webbing strip 116 on the body 102. The webbing strips 110, 116 are attached to the body 102 by stitching, adhesive, or other suitable means. Additional handles may be provided in other locations such as on the very ends 104, 106 of the workout bag assembly 100. Either or both ends 104, 106 as well as other locations on the body 102 may include hook-and-loop fabric areas so that insignia or other group indicia may be easily attached to the workout bag assembly 102. Typical indicia includes a name tag, a fire station number, a military company and the like.

The number and size of the handles 112, 114 may vary depending on the size and intended use of the workout bag assembly 100. Preferably, there are two inner handles 112 and three outer handles 114 on each end 104, 106. The handles 112, 114 may be formed from heavy, nylon strapping material with reinforced stitching. Other materials may be used for the handles 112, 114 including cloths of natural and synthetic fibers, leather, synthetic leather, plastic and polymer-based handles, as well. The handles 112, 114 may be padded or include an optional padding sleeve (not shown) attached by hook-and-loop fabric.

Still referring to FIG. 2, the workout bag assembly 100 also includes shoulder straps 122. A single shoulder strap could also be used. The shoulder straps 122 can attach to the body 102 in a variety of ways. For example, the shoulder straps 122 can be stitched to the body 102. The shoulder straps 122 typically include a centrally padded section 124, typically made of a relatively thick, cushioned material. These padded sections 124 rest comfortably on the shoulders to support and carry the workout bag assembly 100 easily. The shoulder straps 122 also include upper and lower connector sections 126 which provide easy adjustment. The connector sections 126 are typically made of a relatively thin, webbing material and have minimal or no padding.

As shown, the shoulder straps 122 include upper and lower connector sections 126 that include attachment buckles 128. The sections 126 can be inserted into the handles 112, 114 to form a loop, then passed secured with the buckles 128. Alternatively, D-shaped hoops, buckles and the like can be selectively attached to the body 102. The shoulder straps 122 can also be adjusted lengthwise using a tri-glide clip, slide piece, or other member. The shoulder straps 122 also include horizontal front straps 131, 133 secured by clips 135 so that the length is adjustable. A snap buckle assembly 137 selectively secures the front straps 131, 133 together.

Figure 3:
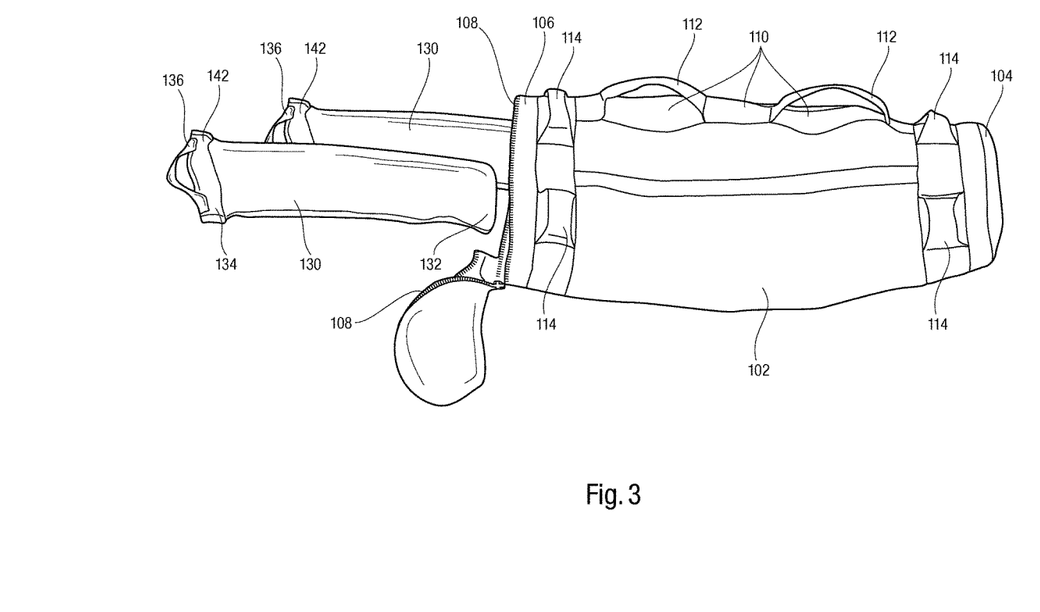
FIG. 3 is an open view of a workout bag assembly with the tubes for sand removed from the body in accordance with the subject technology.

Referring now to FIG. 3, the workout bag assembly 100 is shown with the accessible end 106 open. A plurality of tubes 130 may be securely stored inside the body 102. Each tube 130 is preferably filled with sand, cat litter, or a material to provide weight inside the workout bag assembly 100. In the embodiment shown, three tubes 130 are provided so that the total weight provided can be reduced by thirds as desired for the intended activity and fitness level. Preferably, each tube weighs about 10-15 pounds when filled with sand.

Each tube 130 has a closed end 132 and an accessible end 134 with a handle 136. The handle 136 allows for easy handling as well as using each tube 130 independently as a fitness weight. Each accessible end 134 includes an inner hook-and-loop fabric closure 138. For added closure, each accessible end 134 also includes an outer hook-and-loop fabric closure 140. Preferably, the outer hook-and-loop fabric closure 140 has a hook fabric flap 142 that folds over the inner hook-and-loop fabric closure 138 to engage a complimentary loop fabric patch 144 on the tube 130. Other closures such as zippers, buckles, tie-flaps and the like can be used to close the accessible end 134 of the tubes 130.

Figure 4:
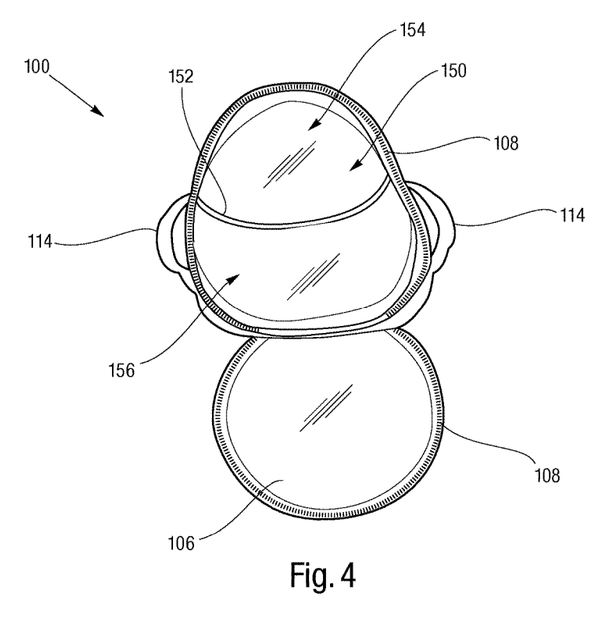
FIG. 4 is an interior view of a workout bag assembly in accordance with the subject technology.

Referring now to FIG. 4, an interior view of the workout bag assembly 100 is shown. The interior 150 is partitioned by a hammock 152, which subdivides the interior 150 into two parts 154, 156. A small part 154 is sized and dimension to be about one third of the interior 150 so that a single tube 130 fits snugly therein. A large part 156 is sized and dimensioned to be about two-thirds of the interior 150 so that two tubes 130 fit snugly therein. The hammock 152 is centered about the inner handles 112 for even weight distribution whether one, two, or three tubes 130 are retained in the interior 150. As would be appreciated based upon review of the subject technology, the total weight of the workout bag assembly 100 may be adjusted by controlling the type and how much material is placed inside the tubes 130, and how many tubes 130 are placed inside the workout bag assembly 100. For example, the tube 130 may contain a mix of material such as a combination of sand and foam peanuts to reduce the weight.

The total capacity the workout bag assembly may also be adjusted by manufacturing a smaller or larger tube with similar adjustments to the workout bag assembly to prevent sliding of the tubes within. Various workout bag assemblies may be sold as a set. Thus, the workout bag assemblies may also be adjusted and/or swapped between exercises, which is done easily by using a different bag, or adding/removing tubes from one of the workout bag assemblies. The weight a typical workout bag can vary from about 12 to about 36 pounds. Other versions may vary from about 2 to about 6 pounds or about 20 to about 60 pounds. Another version may have four tubes and three interior chambers so that the weight could be varied by quarters instead of thirds.

In use, the workout bag assembly 100 can be lifted by a user in a number of ways. The user can grip the inner handles 112 permitting a number of different movements. Alternatively, the user can grip any one of the handles 114 or handles 114 from different end 104, 106 to provide different grips on the workout bag assembly 100 for isolating different muscles during a workout.

While holding the workout bag assembly 100, the user can perform any number of lifting exercises with the workout bag assembly 100, such as a clean and jerk, curls, presses, deadlifts, extended arm holds, squats, arm raises, push presses and the like as is known in the art of exercising with weights. By attaching the optional shoulder straps 122, the user can wear the workout bag assembly 100 like a backpack for additional exercises such as pushups, dips, hiking, walking, running, jogging, jumping, jump training and other calisthenics with the added difficulty of carrying the weight of the workout bag assembly 100. Workout bag assemblies in accordance with the subject technology provide an added level of challenge and difficulty to an athlete's training by providing a versatile and adjustable workout bag assembly that can have its weight metered to the desired amount and lifted and held in a number of different positions by the athlete.

Preferably, the workout bag assembly can be fine tuned for occupational training. For example, members of the armed services, firefighters and law enforcement professionals are often required to carry large amounts of gear across great distances. The workout bag assembly can be modified to simulate the professional gear so that people can perform vocational training at home, on off days, or anywhere without having to actually have the specialty gear available. One modification is to match the weight of the workout bag assembly, distribution of weight and carrying mechanism to the weight, distribution of weight, and carrying mechanism of the specialty gear that must be carried. As such, the body and tubes may take any acceptable shape.

It is envisioned that the workout bag assembly will come with access to instructional video whether it be by providing a DVD with the workout bag assembly, accessing streamed content from the Internet or other delivery methods now known and later developed. The video content can provide instruction and motivation in the form of workout routines performed by experts in the field of fitness training. Further, the workout bag assembly can also be adorned with reflective material, pockets, loops for attaching things, clips, indicia such as trademarks and slogans, and the like.

Another version of the workout bag assembly utilizes one or more waterproof tubes. The waterproof tube may simply utilize the water for weight. The water may also be chilled, so that when the workout bag assembly is worn using the straps, the workout bag assembly provides a cooling function for the user. The water tubes may also be built into the body 102 with outer fill spouts that are closed by selectively releasable valves or the like. The water bag version is particularly well-suited to travel as the water compartments are easily filled in a hotel sink or tub. The water tubes may also have flexible leads to allow the user to drink fluid therefrom.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., straps, connections, hammocks, tubes, reinforcements and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A workout bag assembly comprising:
a tubular body extending between a closed end and an accessible end, the tubular body defining an interior;
   a partition dividing the interior of the tubular body into a first compartment and a second compartment;
   a first reinforced webbing strip encircling the tubular body adjacent to the closed end, the first reinforced webbing strip including a plurality of first strip outer handles extending therefrom and encircling the tubular body;
   a second reinforced webbing strip encircling the tubular body adjacent to the accessible end, the second reinforced webbing strip including a plurality of second strip outer handles extending therefrom and encircling the tubular body;
   a third reinforced webbing strip extending between the first reinforced webbing strip and the second reinforced webbing strip;
   a first inner handle coupled to the third reinforced webbing strip and having a first inner handle end adjacent to the closed end;
   a second inner handle coupled to the third reinforced webbing strip having a second inner handle end adjacent to the accessible end; and
   three tubes, each tube having a closed end and an accessible end for filling the respective tube with a weighted material,
   wherein the first compartment is sized and dimensioned to be about one-third of the interior so that a first tube of the three tubes fits therein when the first tube is filed with the weighted material, and wherein the second compartment is sized and dimensioned to be about two-thirds of the interior so that two tubes of the three tubes fit therein when the two tubes are filled with the weighted material.

2. The workout bag assembly as recited in claim 1, further comprising: a first shoulder strap including a first strap lower connector section and a first strap upper connector section extending from a first strap central padded section, the first strap connector sections capable of being removably attached to any of the following: the plurality of first strip outer handles; the plurality of second strip outer handles; the first inner handle; and the second inner handle.

3. The workout bag assembly as recited in claim 2, further comprising: a second shoulder strap including a second strap lower connector section and a second strap upper connector section extending from a second strap central padded section, the second strap connector sections capable of being removably attached to any of the following: the plurality of first strip outer handles; the plurality of second strip outer handles; the first inner handle; and the second inner handle.

4. The workout bag assembly as recited in claim 3, further comprising:

a first front horizontal strap having a first end coupled to the first shoulder strap and a second end coupled to a buckle portion;
a second front horizontal strap having a first end coupled to the second shoulder strap and a second end coupled to the buckle portion; and
the buckle portion capable of being removably connected with the buckle portion, thereby connecting the first shoulder strap to the second shoulder strap.

* * * * *